(12) United States Patent
Filho et al.

(10) Patent No.: US 12,105,818 B2
(45) Date of Patent: Oct. 1, 2024

(54) COMPLIANCY MANAGEMENT

(71) Applicant: SAP SE, Walldorf (DE)

(72) Inventors: Roberto Usberti Filho, Ladenburg (DE); Vladimir Wasiutinski, Dresden (DE)

(73) Assignee: SAP SE, Walldorf (DE)

( * ) Notice: Subject to any disclaimer, the term of this patent is extended or adjusted under 35 U.S.C. 154(b) by 282 days.

(21) Appl. No.: 17/573,522

(22) Filed: Jan. 11, 2022

(65) Prior Publication Data
US 2023/0222234 A1   Jul. 13, 2023

(51) Int. Cl.
*G06F 21/64* (2013.01)
*G06F 21/62* (2013.01)

(52) U.S. Cl.
CPC .............. *G06F 21/62* (2013.01); *G06F 21/64* (2013.01)

(58) Field of Classification Search
None
See application file for complete search history.

(56) References Cited

U.S. PATENT DOCUMENTS 10,467,426 B1 *  11/2019  Esposito ........... G06F 16/24564
10,484,429 B1    11/2019  Fawcett et al.

OTHER PUBLICATIONS

European Patent Office, Extended European Search Report, Issued in related EP App. No. 22208770.2, dated Jun. 6, 2023, 8 pgs.

\* cited by examiner

*Primary Examiner* — Jeffrey R Swearingen
(74) *Attorney, Agent, or Firm* — Fountainhead Law Group, PC (57) ABSTRACT

Compliancy management is implemented across a plurality of applications utilizing a generic model. The generic compliancy model includes references to external data objects. A compliancy state record for each data object records a current compliancy status (e.g., active, inactive, blocked, deleted, incompliant). That status may transition in response to the receipt of an incoming compliancy event that is processed according to a rule set. The compliancy state record is associated with one or more compliancy object records storing data of the external data object. The generic structure of the compliancy model is agnostic to specific application data models of the services, thereby offering benefits of scalability that are compatible with modern microservice-based architectures.

19 Claims, 7 Drawing Sheets

COMPLIANCY MANAGEMENT

BACKGROUND

Unless otherwise indicated herein, the approaches described in this section are not prior art to the claims in this application and are not admitted to be prior art by inclusion in this section.

In order to be lawfully deployed within a particular jurisdiction, a software application may need to be in compliance with one or more specific national and local regulations. Such regulations can relate to Data Privacy Protection (DPP), for example the General Data Protection Regulation (GDPR) in Europe.

Increasingly, software applications may exhibit complex architectures that invoke many different microservices. Accordingly, ensuring the compliance of such a software application across a varied regulatory landscape can pose a significant challenge.

SUMMARY

Compliancy management is implemented across a plurality of applications utilizing a generic model. The generic compliancy model includes references to external data objects. A compliancy state record for each data object records a current compliancy status (e.g., active, inactive, blocked, deleted, incompliant). That status may transition in response to the receipt of an incoming compliancy event that is processed according to a rule set. The compliancy state record is associated with one or more compliancy object records storing data of the external data object. The generic structure of the compliancy model is agnostic to specific application data models of the services, thereby offering benefits of scalability that are compatible with modern microservice-based architectures.

Embodiments are particularly suited for use with distributed systems, but can also be applied to other kinds of systems. Embodiments update compliancy status in another component (e.g., application, subsystem) after the status or purpose was changed in a component, and accomplish this updating in a generic way.

The following detailed description and accompanying drawings provide a better understanding of the nature and advantages of various embodiments.

DETAILED DESCRIPTION

Described herein are methods and apparatuses that perform compliancy management. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Figure 1:
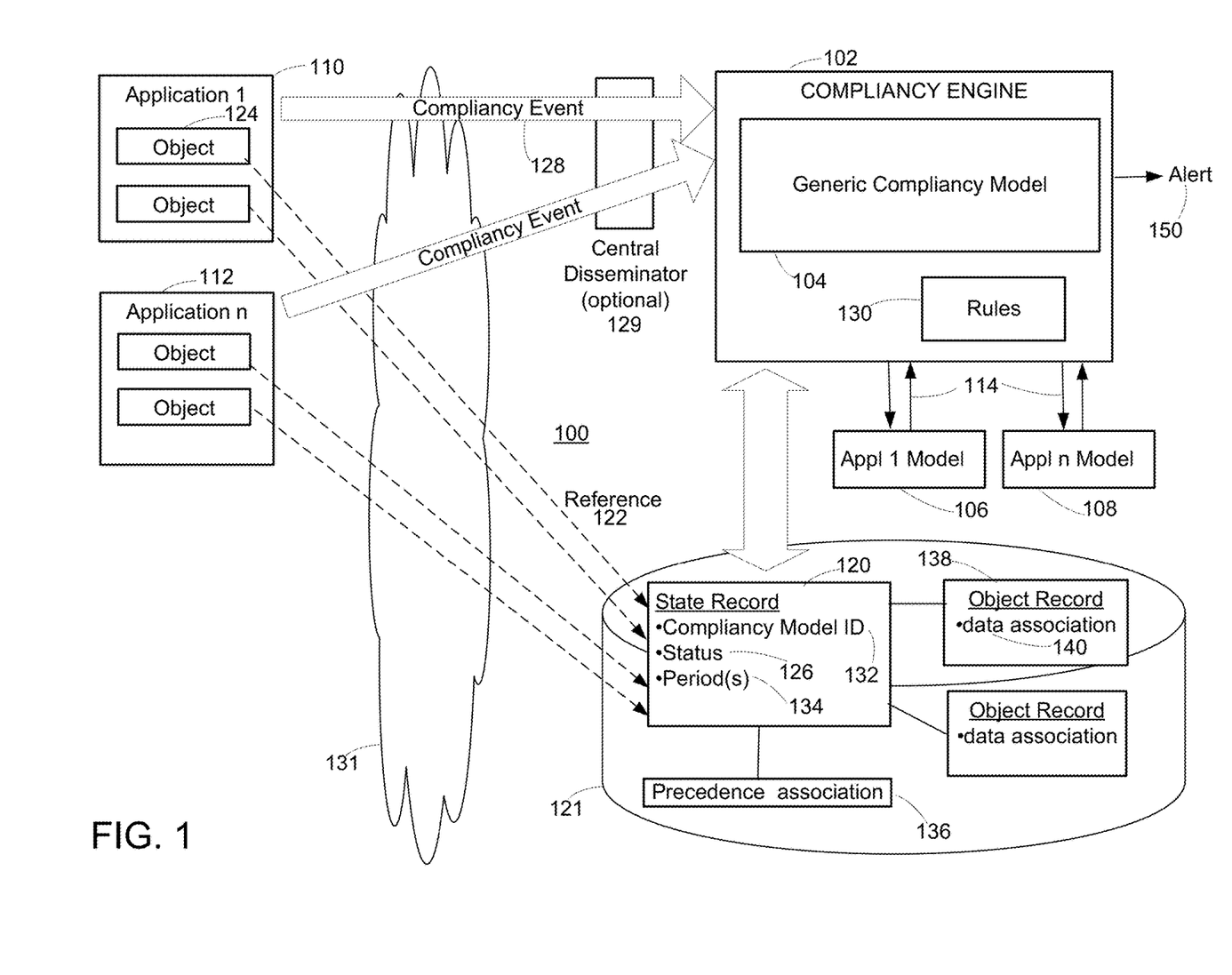
FIG. 1 shows a simplified diagram of a system according to an embodiment.

FIG. 1 shows a simplified view of an example system that is configured to implement compliancy management according to an embodiment. Specifically, system 100 comprises a compliancy engine 102 that includes a compliancy model 104.

The compliancy model overlies models 106, 108 of external applications 110 and 112, respectively. The generic structure of the compliancy model promotes its ability to interact 114 with the different models of the applications.

The compliancy engine is responsible for implementing a compliancy management process. This involves tracking the compliancy status of data objects 116 that are part of the external applications.

In particular, the compliancy engine creates and maintains a state record 120 within a non-transitory computer readable storage medium 121. The state record includes a reference 122 to a data object 124 of an external application whose compliancy is to be managed.

The state record includes information such as the current compliancy status 126 of the data object of the external application. Examples of compliancy status can include but are not limited to:

inactive,
active,
blocked,
deleted,
incompliant.

Changes in this compliancy status are tracked by the state record. Such transitions between compliancy status of a data object, may be triggered by the receipt of compliancy events 128. One example of a compliancy event could be a user altering the consent for the data object, thereby ensuring up-to-date the access control.

It is noted that triggering of events can be realized not only per event receipt/event messaging, but also by other mechanisms (e.g., polling). these may also include pre-configured timers and internal configurable rules 130 which can define basic compliancy or compliancy templates. When appropriate, default application models, rules, and/or compliancy events can be superseded using this mechanism.

Accordingly, the compliancy engine is configured to receive an incoming compliancy event. In some cases, this compliancy event may be received directly from the external application (e.g., via the cloud 131). In other cases, the compliancy event may be received via a central disseminator 129, that is configured to recognize, collect, and disseminate events relevant to compliancy.

Then, the compliancy engine references compliancy rules 130 and the underlying application models in order to manage compliancy of those external applications. Continuing with the instant example, while the incoming compliancy event may alter consent, a compliancy rule may preclude such alteration of consent due to privacy regulations.

Thus, the result of application of the compliancy rules may result in a transition of the status of the state record. For example, this violation of privacy regulations arising from the compliancy event could result in the status of the state record for a particular data object transitioning from "active" to "incompliant".

It is noted that the state record may include a variety of information in addition to compliancy status. For example, the state record may include an identifier 132 for the compliancy model. The state record may also include a time period 134, for example reversion period(s) and/or residence period(s) for the particular data object.

The state record is in turn associated with other data objects. One such association may be to precedence 136, which determines how the state record is processed with regards to the state records of other data objects of external applications.

Another such association of a state record may be to object records 138. These object records store data 140 of the data object, and may be updated as that data changes. As described further below, the object records may include an identifier of the specific data object, for example a Universally Unique Identifier (UUID) or a combination of table and column names.

Apart from maintaining and updating the stored state records, the compliancy engine may perform other roles. For example, the compliancy engine could be directed by the rules, to take actions based upon compliancy matters. Returning again to the simplified example, where a user has changed altered a consent in contravention of regulations, the engine may be configured to issue an alert 150 (to the user or an administrator) regarding the nascent compliancy issue.

It is noted that the compliancy engine may perform still other functions. For example, the compliancy engine may propagate compliancy status changes to other objects ("derived data") based on the respective object.

An example could be an analytical view or a Key Performance Indicator (KPI) calculation using the data object. This can be simply implemented by associating derived data with the same compliancy record as the source data, with the derived data requiring the same compliancy rules.

Another possible functionality that may be performed by the compliance engine could be to trigger further actions, e.g. when a required time period after the request for deletion has expired. The actions can be also compiled in a job (e.g. running overnight) to enhance performance.

Embodiments allow such automated functionality to be implemented in various ways by particular users. For example, the default functionality could call only for alerting by the system, which can be further extended to automated actions as described above.

Figure 2:
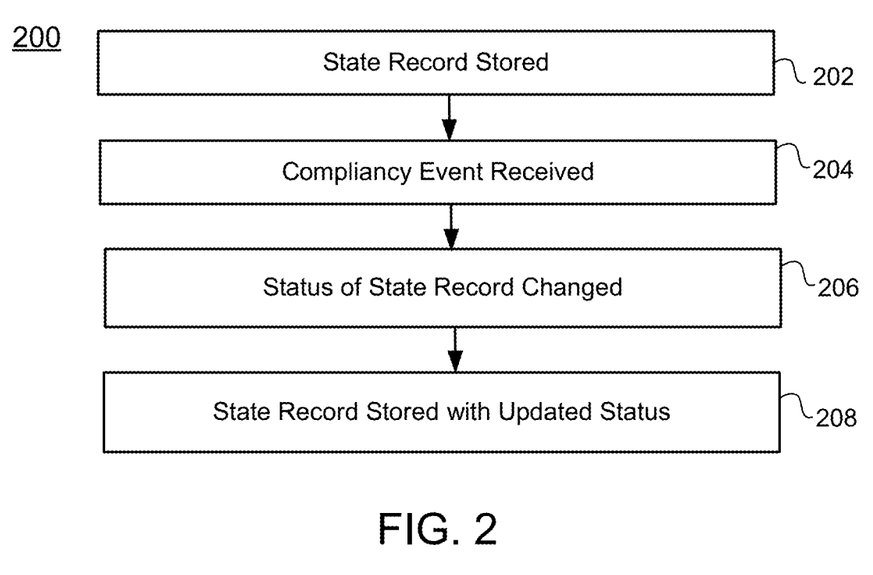
FIG. 2 shows a simplified flow diagram of a method according to an embodiment.

FIG. 2 is a flow diagram of a method 200 according to an embodiment. At 202, a state record is stored for a data object of an external application.

At 204, a compliancy event is received from the external application. At 206, in response to the compliancy event, rules are referenced in order to change a status of the state record.

At 208, the state record is stored with the updated status. Read Access Logging (RAL) functionality may also be provided by compliance management according to an embodiment.

Further details regarding tenant provisioning for compliancy management according to various embodiments, are now provided in connection with the following example.

Example

This example describes the compliancy approach based upon a generic model, for tracking the status of compliancy-relevant records. One such exemplary generic compliancy data model is now discussed.

Figure 3:
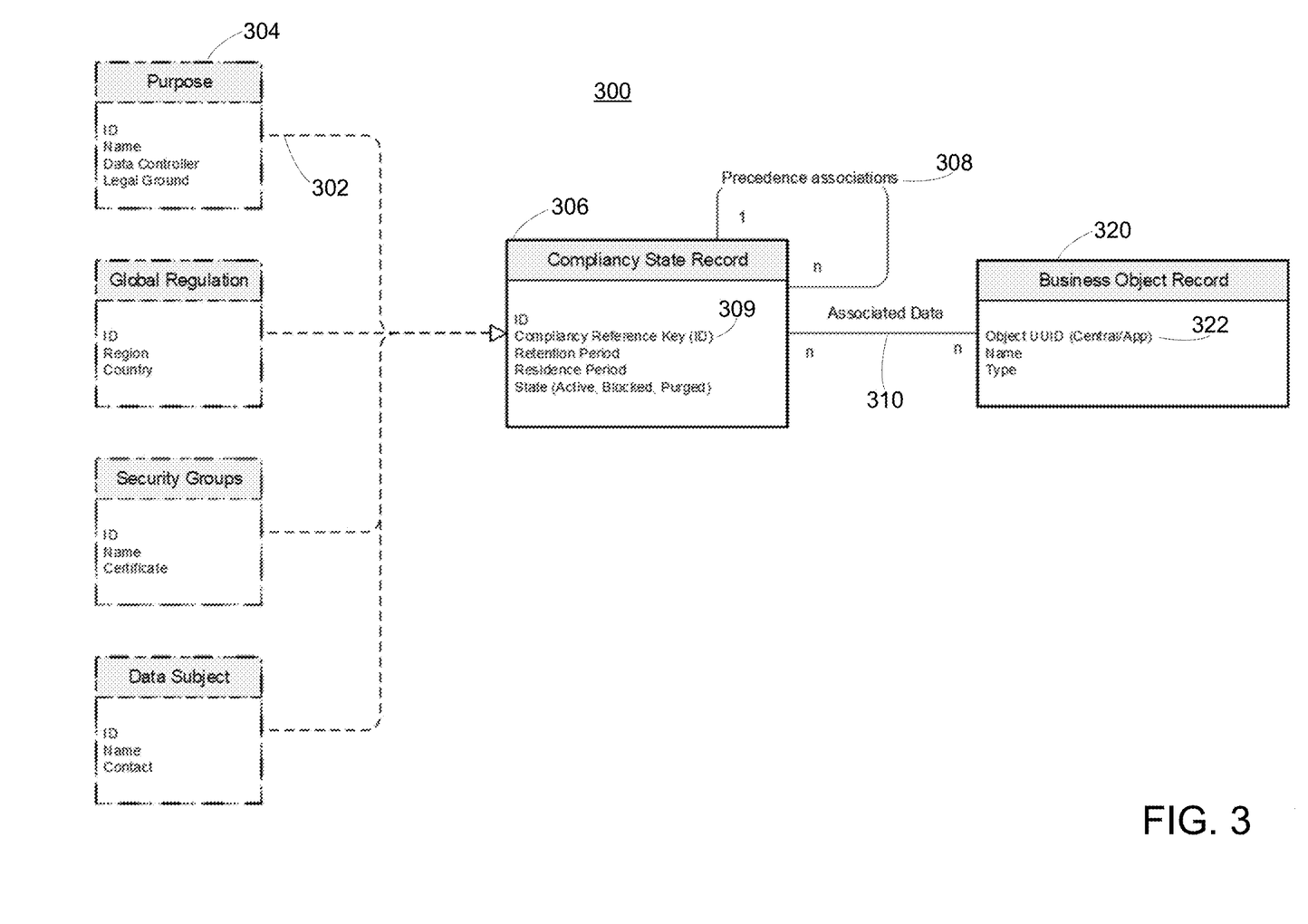
FIG. 3 shows a simplified view of a compliancy model according to an example.

The compliancy data model is deployed on top of the specific application data models. As shown in FIG. 3, the compliancy data model 300 contains the references 302 to the relevant records, grouped by compliancy rules.

The external objects 304 shown on the left side of FIG. 3, exist outside the compliancy management system. They are part of the applications or other kernel services such as Governance, Risk, Compliance (GRC) or Consent Manager that are available from SAP SE of Walldorf, Germany.

The external objects interface with the compliancy management system through the Compliancy State Record (CSR) 306 which manages the compliancy of the objects. A Compliancy State Record object is responsible for one compliancy type/rule.

A compliancy state record object may perform one or more of the following functions:
  track the state of the compliancy rules,
  enforce precedence association 308 (cascading compliancy req.)—discussed below,
  maintain external ID reference 309,
  serve as a certificate/token.

A compliancy state record is associated 310 to n Business Object Records 320. A business object record can be responsible to perform one or more of the following roles:
  maintaining Object Reference 322—here a Universally Unique Identifier (UUID)
  can be associated to n Compliancy States The external objects provide the events to change the compliancy state, e.g. by the corresponding API requests to change the compliance state for the corresponding Compliancy State (referenced by the ComplianceReferenceID) or Business Object (referenced by the ComplianceReferenceID and Object UUID).

Precedence associations are now discussed in detail. The fact that compliancy state records can be associated with each other, provides the flexibility of configuring compliant access where all the data in a specific landscape, tenant, or application is seen as a set. Embodiments allow any number of compliancy state records to be applied to the entire set, a sub-set, or even intersect data with other compliancy records.

Figure 4:
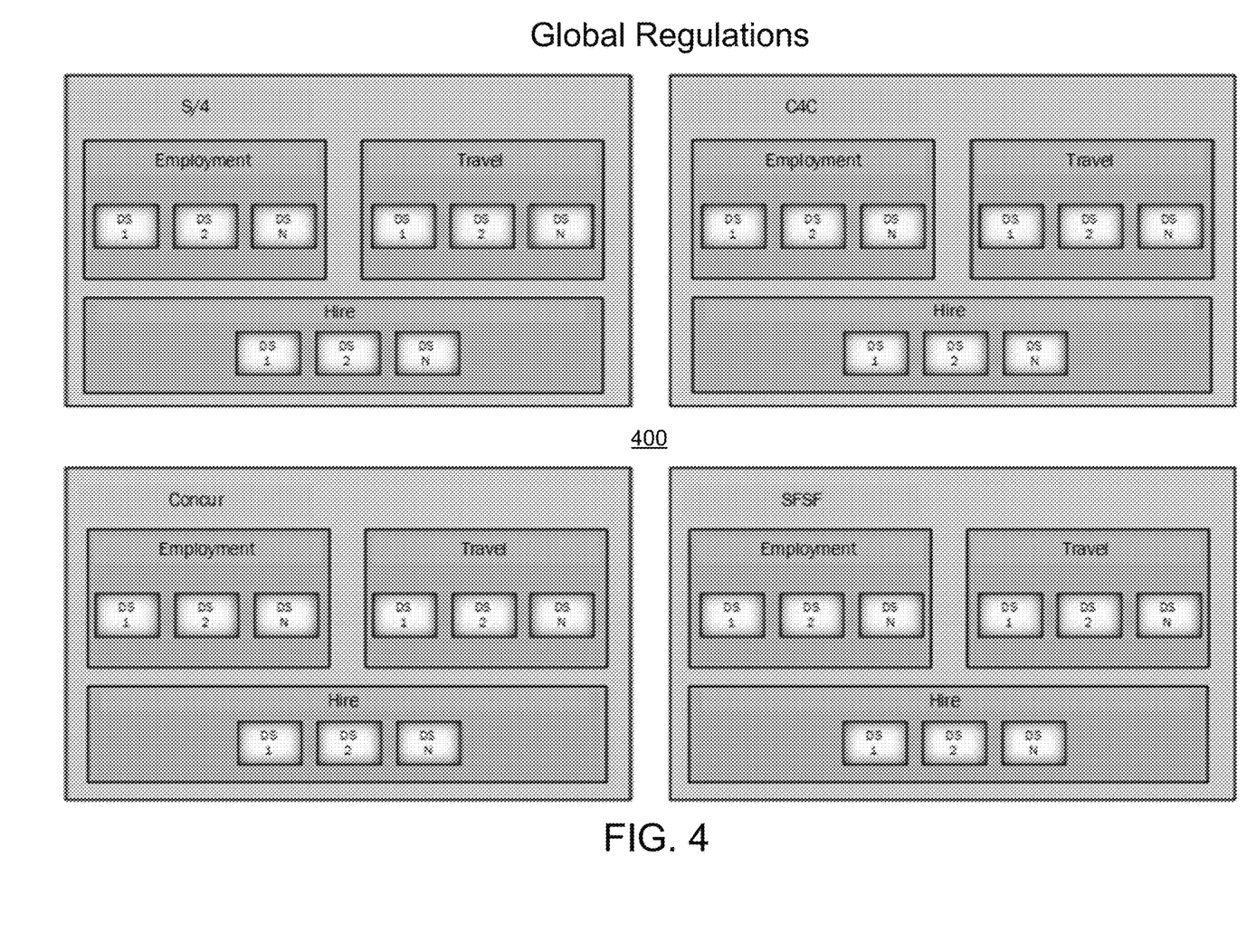
FIG. 4 illustrates a data lake for which precedence associations are assigned in the context of a global regulatory scheme.

FIG. 4 illustrates precedence associations in the context of a global regulatory scheme relating to protection of private information residing in a common data lake 400. This exemplary embodiment permits configuration of compliancy management for the data lake in the following manner.

First, a master CSR is created which restricts all access to the data to the Database Administrator (DBA) or System Administrator. This ensures that all the data in the tenants follows the global regulations.

In this example, four (4) different applications (e.g., SAP S/4 HANA; C4C; Concur; SuccessFactors SFSF) push data in the common data lake. Each application is given its own CSR, which is derived from the master CSR. In this manner, each application will have a set of data in the data lake, but the master CSR will have access to all data.

In this example, a Data Privacy Protection (DPP) system will be given a set of CSRs in order to manage the following distinct purposes: Employment, Travel and Hire. As shown FIG. 4, one such set of CSRs is assigned for each application. In this manner, data will be managed by the DPP system, and only those permitted access by the DPP system will be granted access to these subsets of data.

Finally, the DPP system will create a CSR:
  for each data subject it manages,
  for each purpose, and
  for each application.

In this manner, if all the data from a specific data subject has to be accessed or deleted, those sub-sets are easily reachable.

The compliancy events can be sent directly by the respective applications. Or, compliancy events can be disseminated via a central compliancy system such as the SAP Data Privacy Integration service available from SAP SE, of Walldorf, Germany.

For storage types (e.g., relational database, document files, object storage) a specific mechanism for mapping of the business object record key to the business object may be implemented. In one example, for the relational database storage type the business object can be identified by:

<table_name>-<column_name>-<business object id> combination, or the global search for business object UUID in all tables (e.g., smaller data volumes).

Figure 5:
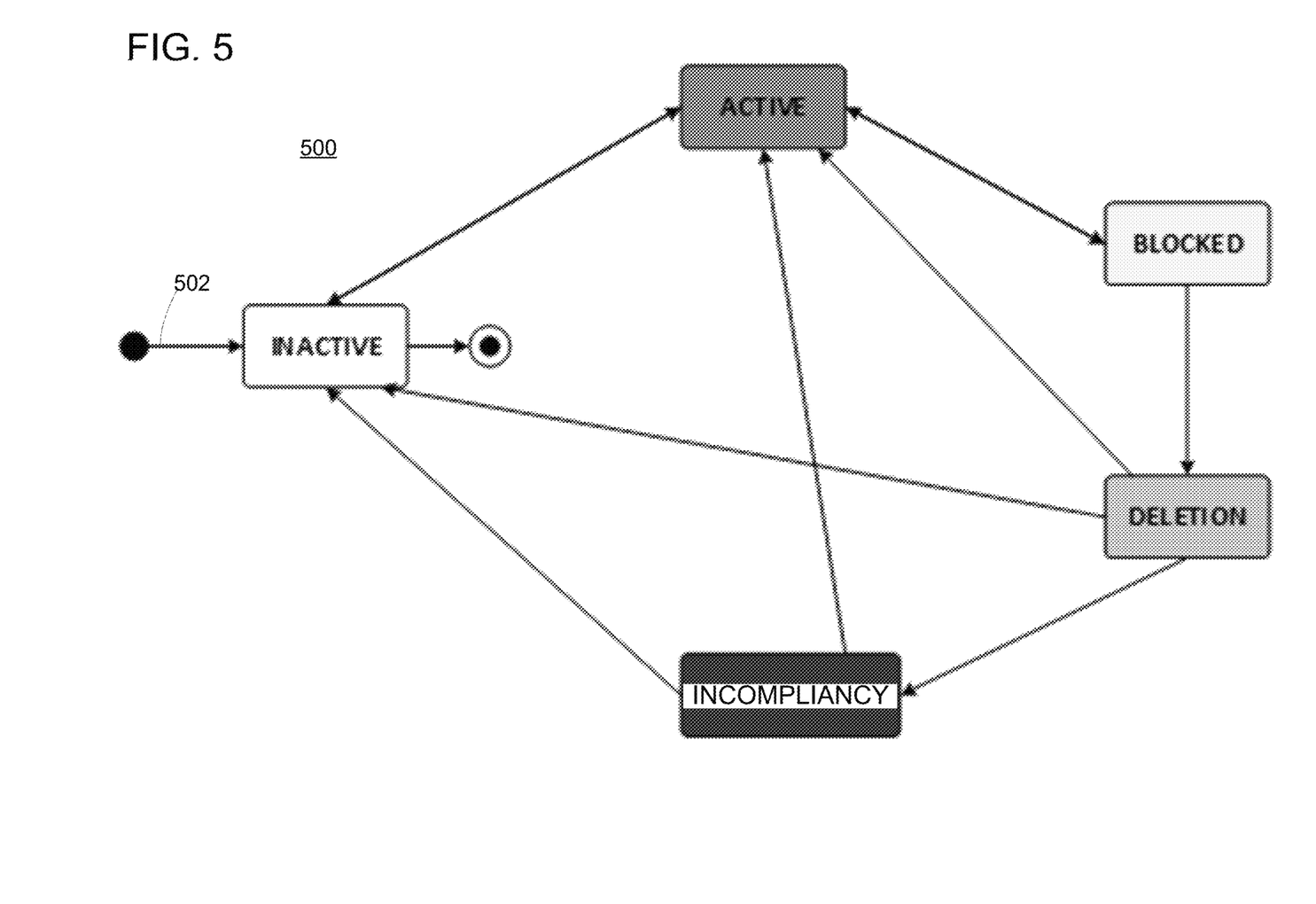
FIG. 5 shows a simplified block diagram illustrating various compliancy statuses and possible transitions there between, according to the example.

The compliancy process is now further described in connection with FIG. 5. The compliancy process 500 is realized within the service as a state machine.

The transitions are triggered by the compliancy events 502. Such transitions can include but are not limited to changes in the status of a data object between states such as:
inactive,
active,
blocked,
deleted (purged), or
incompliancy.

The compliancy management process includes tracking the status of data objects and ensuring the access control. Status changes might be triggered by compliancy events—such as changing the consent for the data object.

The compliancy management process is also performed upon replicas of a data object in an application. This may involve dealing with multiple storages, formats, data types, and/or compliancy rules.

Examples of incoming compliancy events recognized and processed by the compliancy management process, can include but are not limited to one or more of:
creating/updating/deleting a compliancy rule for a data object,
creating/updating/deleting a consent for a business record (e.g., as external event from SAP Data Privacy Integration service)
executing a relevant change of the external object,
implementing timers (e.g., on expiring a retention period 320).

Systems and methods according to embodiments, may avoid one or more issues that can be associated with compliancy management. In particular, embodiments may offer a generic approach for tracking and updating the compliancy rules across a number of different applications.

Embodiments can be agnostic to the application data models of the services. Thus, embodiments are scalable within microservice-based architectures.

An embodiment may not require change to a primary data model. Thus, it can be easily applied to a variety of data models.

For particular embodiments, the application logic and the compliancy logic are separated. This simplifies development and facilitates integration of the services.

For certain embodiments, the detail level is configurable. That is, the data can be arranged to the data sets/groups exhibiting different granularities.

Returning now to FIG. 1, there the particular embodiment is depicted with the compliancy engine as being located outside of the database. However, this is not required.

Rather, alternative embodiments could leverage the processing power of an in-memory database engine (e.g., the in-memory database engine of the HANA in-memory database available from SAP SE), in order to perform various functions as described above.

Figure 6:
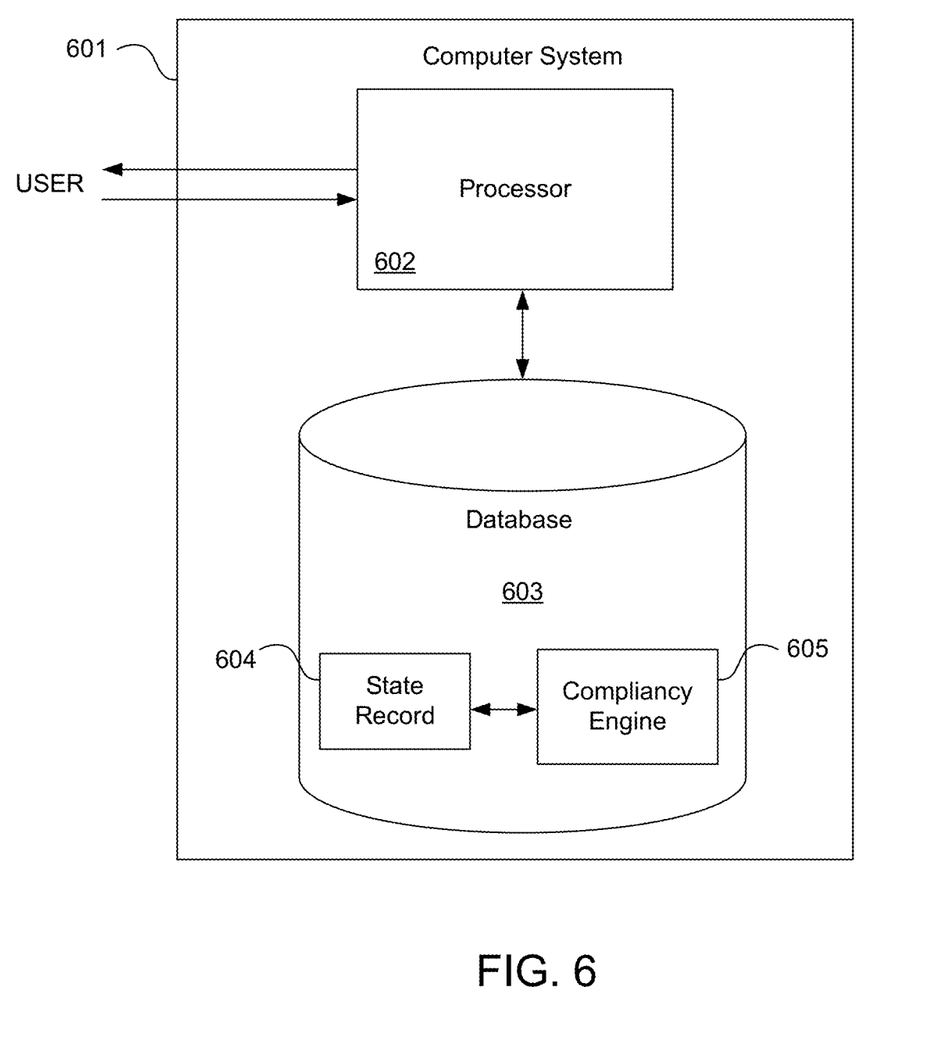
FIG. 6 illustrates hardware of a special purpose computing machine configured to implement compliancy management.

Thus FIG. 6 illustrates hardware of a special purpose computing machine configured to perform compliancy management according to an embodiment. In particular, computer system 601 comprises a processor 602 that is in electronic communication with a non-transitory computer-readable storage medium comprising a database 603. This computer-readable storage medium has stored thereon code 605 corresponding to a compliancy engine. Code 604 corresponds to a state record. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1. Computer implemented system and methods comprising:
storing in a non-transitory computer readable storage medium, a state record comprising an identifier and a compliancy status of a data object of a software application;
receiving a compliancy event affecting the data object;
processing the compliancy event according to compliancy rules in order to change the compliancy status; and
storing the state record in the non-transitory computer readable storage medium with a changed compliancy status.

Example 2. The computer implemented system and method of Example 1 wherein the compliancy event is received from the external application via a central disseminator.

Example 3. The computer implemented system and method of Examples 1 or 2 wherein the changed compliancy status indicates incompliancy.

Example 4. The computer implemented system and method of Examples 1, 2, or 3 wherein the state record includes a time period.

Example 5. The computer implemented system and method of Examples 1, 2, 3, or 4 wherein the identifier comprises a Universally Unique Identifier (UUID).

Example 6. The computer implemented system and method of Examples 1, 2, 3, 4, or 5 wherein the non-transitory computer readable storage medium comprises a database; and the identifier comprises a combination of a database table name and a column name.

Example 7. The computer implemented system and method of Examples 1, 2, 3, 4, 5, or 6 wherein the non-transitory computer readable storage medium comprises a database; and the identifier comprises a combination of a database table name and a column name.

Example 8. The computer implemented system and method of Examples 1, 2, 3, 4, 5, 6, or 7 wherein the compliancy rules consider a precedence association of the state record.

Example 9. The computer implemented system and method of Example 8 wherein the precedence association is based upon the software application.

Figure 7:
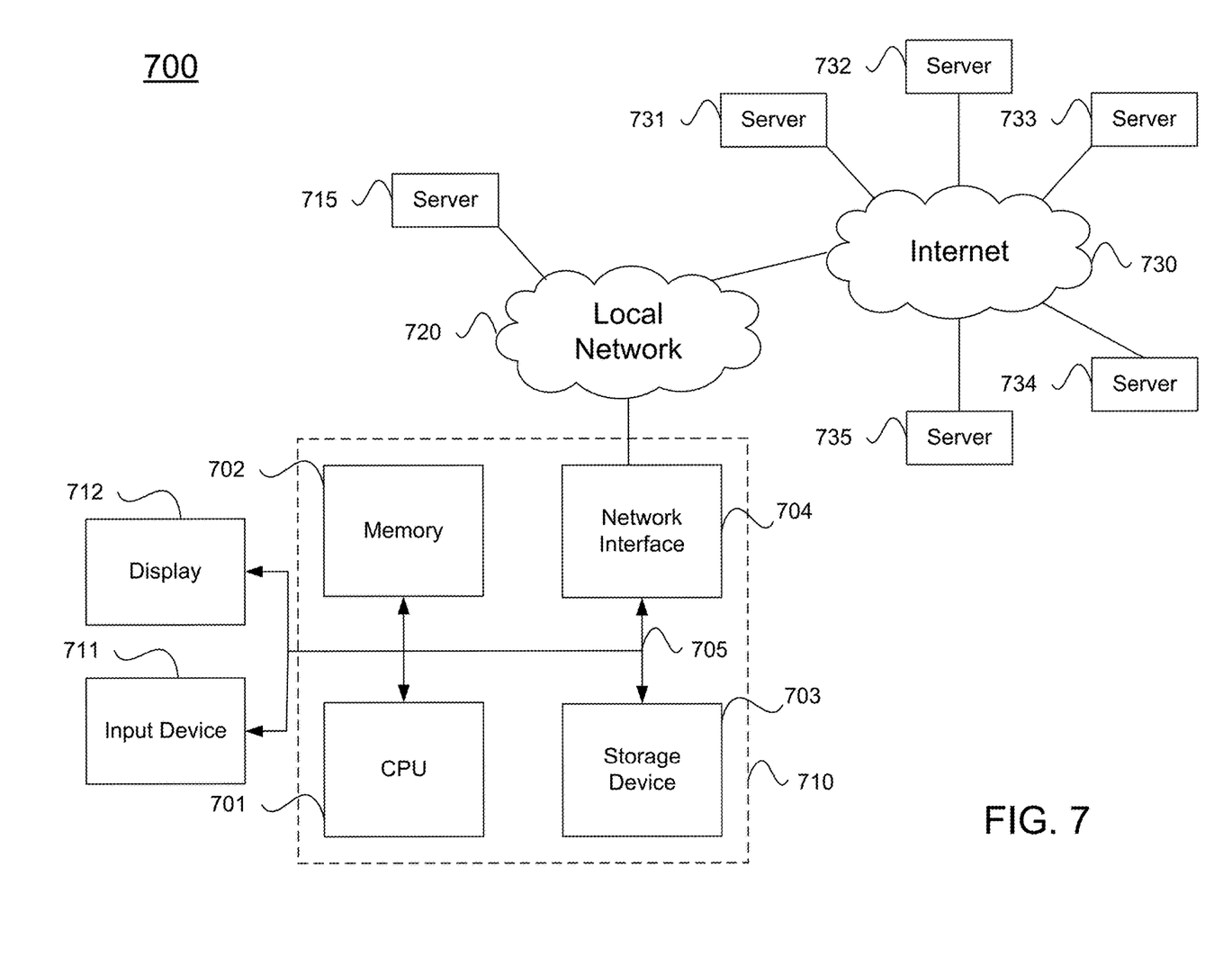
FIG. 7 illustrates an example computer system.

An example computer system 700 is illustrated in FIG. 7. Computer system 710 includes a bus 705 or other communication mechanism for communicating information, and a processor 701 coupled with bus 705 for processing information. Computer system 710 also includes a memory 702 coupled to bus 705 for storing information and instructions to be executed by processor 701, including information and instructions for performing the techniques described above, for example. This memory may also be used for storing variables or other intermediate information during execution of instructions to be executed by processor 701. Possible implementations of this memory may be, but are not limited to, random access memory (RAM), read only memory (ROM), or both. A storage device 703 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 703 may include source code, binary code, or software files for performing the techniques above, for example. Storage device and memory are both examples of computer readable mediums.

Computer system 710 may be coupled via bus 705 to a display 712, such as a Light Emitting Diode (LED) or liquid crystal display (LCD), for displaying information to a computer user. An input device 711 such as a keyboard and/or mouse is coupled to bus 705 for communicating information and command selections from the user to processor 701. The combination of these components allows the user to communicate with the system. In some systems, bus 705 may be divided into multiple specialized buses.

Computer system 710 also includes a network interface 704 coupled with bus 705. Network interface 704 may provide two-way data communication between computer system 710 and the local network 720. The network interface 704 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 704 sends and receives electrical, electromagnetic, or optical signals that carry digital data streams representing various types of information.

Computer system 710 can send and receive information, including messages or other interface actions, through the network interface 704 across a local network 720, an Intranet, or the Internet 730. For a local network, computer system 710 may communicate with a plurality of other computer machines, such as server 715. Accordingly, computer system 710 and server computer systems represented by server 715 may form a cloud computing network, which may be programmed with processes described herein. In the Internet example, software components or services may reside on multiple different computer systems 710 or servers 731-735 across the network. The processes described above may be implemented on one or more servers, for example. A server 731 may transmit actions or messages from one component, through Internet 730, local network 720, and network interface 704 to a component on computer system 710. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
storing in a non-transitory computer readable storage medium, a state record object comprising an identifier and a compliancy status of a data object of an external software application, the identifier comprising a Universally Unique Identifier of the data object, wherein the state record object is associated with one or more object records, wherein a first object record of the one or more object records stores data of the data object of the external software application;
receiving a compliancy event affecting the data object;
processing the compliancy event according to compliancy rules in order to change the compliancy status;
updating the first object record such that the data stored by the first object record is updated separately from the data object of the external software application being updated; and
storing the state record object tin the non-transitory computer readable storage medium with a changed compliancy status.

2. A method as in claim 1 wherein the compliancy event is received from the external software application via a central disseminator.

3. A method as in claim 1 wherein the compliancy rules consider a precedence association of the state record object.

4. A method as in claim 3 wherein the precedence association is based upon the external software application.

5. A method as in claim 1 wherein the changed compliancy status indicates incompliancy.

6. A method as in claim 1 wherein the state record object includes a time period.

7. A method as in claim 1 wherein:
the non-transitory computer readable storage medium comprises a database; and
the identifier comprises a combination of a database table name and a column name.

8. A method as in claim 1 wherein the state record object is stored in a compliancy management system, the compliancy management system receiving the compliancy event from the external software application and performing said processing and storing steps, wherein the compliancy management system comprises a compliancy model and a plurality of application models, wherein the compliancy model overlies the plurality of application models such that performing said processing is based on referencing the plurality of application models.

9. A non-transitory computer readable storage medium embodying a computer program for performing a method, said method comprising:
storing in a database, a state record object comprising an identifier and a compliancy status of a data object of an external software application, the identifier comprising a Universally Unique Identifier of the data object, wherein the state record object is associated with one or more object records, wherein a first object record of the one or more object records stores data of the data object of the external software application;

receiving a compliancy event affecting the data object;

processing the compliancy event according to compliancy rules in order to change the compliancy status;

updating the first object record such that the data stored by the first object record is updated separately from the data object of the external software application being updated; and storing the state record object tin the non-transitory computer readable storage medium with a changed compliancy status.

10. A non-transitory computer readable storage medium as in claim 9 wherein the compliancy rules consider a precedence association of the state record specifying the external software application.

11. A non-transitory computer readable storage medium as in claim 9 wherein the identifier comprises a combination of a database table name and a column name.

12. A non-transitory computer readable storage medium as in claim 9 wherein the changed compliancy status indicates incompliancy.

13. A computer system comprising:

one or more processors;

a software program, executable on said computer system, the software program configured to:

store, on a compliancy management system, a plurality of state record objects, each state record object comprising current compliancy status of a plurality data objects of a plurality of external software applications and a plurality of identifiers each uniquely referencing one of the data objects across the plurality of external software applications, wherein the state record objects comprise a first master state record object comprising a reference to all of the plurality of data objects, a second plurality of state record objects derived from the first master state record object corresponding to each external software application of the plurality of external software applications, and at least a third plurality of state record objects corresponding to subsets of the data objects of the plurality of external software applications;

receive, from at least a portion of the plurality of data objects, a plurality of compliancy events;

process, by the state record objects, the plurality of compliancy events, wherein the compliancy management system comprises a compliancy data model including the plurality of state record objects and a plurality of application data models corresponding to the plurality of external software applications, wherein the plurality of data objects interface with the compliancy management system through the state record objects to change the compliancy status of at least a portion of the plurality of data objects between a plurality of states comprising one or more of: an inactive state, an active state, a blocked state, a deleted state, and an incompliancy state; and store the state record objects with a changed compliancy status.

14. A computer system as in claim 13 wherein one or more state record objects are associated with a plurality of object records, the object records storing the plurality of identifiers uniquely referencing the data objects.

15. A computer system as in claim 13 wherein interfacing, by the plurality of data objects, with the compliancy management system through the state record objects further comprises the plurality of data objects generating API requests configured to change the compliancy status of at least the portion of the plurality of data objects.

16. A computer system as in claim 13 wherein a first compliancy event of the plurality of compliancy events is a calculation generating derived data based on utilization of a particular data object of the plurality of data objects associated with a particular state record object of the plurality of state record objects, wherein the compliancy management system associates the derived data with the particular state record such that the particular data object and the derived data both require a same set of compliancy rules.

17. A computer system as in claim 16 wherein the compliancy management system further receives a change to compliancy status of the particular data object and propagates compliancy status changes to the derived data based on the change.

18. A computer system as in claim 17 wherein the compliancy management system further propagates compliancy status changes to replicas of the particular data object in a corresponding external software application.

19. A computer system as in claim 13 wherein the plurality of state record objects further include a time period, wherein the time period indicates one of a reversion period, a residence period, and a request for deletion period corresponding to data objects of the plurality of data objects associated with the plurality of state record objects, wherein actions associated with the reversion period, the residence period, and the request for deletion period are compiled into a job such that the compliancy management system runs the job based on computing resource utilization.

* * * * *